United States Patent
Jung

(10) Patent No.: US 10,364,922 B2
(45) Date of Patent: Jul. 30, 2019

(54) FLEXIBLE JOINT

(71) Applicant: SEUNGJIN IND. CO., LTD., Ansan-si (Gyeonggi-do) (KR)

(72) Inventor: Ho Jin Jung, Siheung-si (KR)

(73) Assignee: SEUNGJIN IND. CO., LTD (KR)

( * ) Notice: Subject to any disclaimer, the term of this patent is extended or adjusted under 35 U.S.C. 154(b) by 188 days.

(21) Appl. No.: 15/460,447

(22) Filed: Mar. 16, 2017

(65) Prior Publication Data

US 2017/0268705 A1 Sep. 21, 2017

(30) Foreign Application Priority Data

Mar. 21, 2016 (KR) .......... 10-2016-0033616
Feb. 23, 2017 (KR) .......... 10-2017-0024320

(51) Int. Cl.
| | |
|---|---|
| *F16L 19/02* | (2006.01) |
| *A62C 35/68* | (2006.01) |
| *F16L 19/028* | (2006.01) |
| *F16L 33/22* | (2006.01) |

(52) U.S. Cl.
CPC .......... *F16L 19/0218* (2013.01); *A62C 35/68* (2013.01); *F16L 19/0286* (2013.01); *F16L 33/223* (2013.01)

(58) Field of Classification Search
CPC . F16L 19/0218; F16L 19/028; F16L 19/0283; F16L 19/0286
USPC ........................ 285/903, 247, 354
See application file for complete search history.

(56) References Cited

U.S. PATENT DOCUMENTS

| | | | | | |
|---|---|---|---|---|---|
| 2,035,978 | A | * | 3/1936 | Parker ............ | F16L 19/04 285/234 |
| 2,453,813 | A | * | 11/1948 | Prince ............ | F16L 19/04 285/332.3 |
| 2,545,930 | A | * | 3/1951 | Richardson ...... | F16L 19/0206 285/136.1 |
| 3,092,404 | A | * | 6/1963 | MacWilliam ..... | F16L 19/028 285/334.4 |

(Continued)

FOREIGN PATENT DOCUMENTS

| | | | | |
|---|---|---|---|---|
| CA | 2369410 A1 | * | 10/2000 | .......... F16L 19/0218 |
| EP | 0203887 A2 | * | 12/1986 | .......... F16L 19/0238 |

(Continued)

*Primary Examiner* — David Bochna
(74) *Attorney, Agent, or Firm* — Mendelsohn Dunleavy, P.C.

(57) ABSTRACT

A flexible joint including: a socket including a front end portion provided with O-ring grooves, and a male threaded portion extending outward radially, circumferentially, and stepwisely from the front end portion with male threads formed thereon; a nut including an engaging portion engaged with an outer circumferential surface of the front end portion, and a female threaded portion extending stepwisely from the engaging portion and engaged with the male threaded portion; a sprinkler flexible tube communicating with an inner circumference of the socket, and having an enlarged portion inserted between the front end portion of the socket and the engaging portion of the nut, and a leak-proof portion or a double bent portion bent outward from an end of the enlarged portion; and O-rings fitted over the O-ring grooves, whereby the enlarged portion presses the O-rings to come into close contact with each other, thereby preventing leakage.

19 Claims, 7 Drawing Sheets

(a)

(56) References Cited

U.S. PATENT DOCUMENTS

| | | | | |
|---|---|---|---|---|
| 3,408,093 A * | 10/1968 | Epstein | F16L 19/0218 285/347 |
| 4,729,583 A * | 3/1988 | Lalikos | F16L 33/01 285/222.1 |
| 4,919,455 A * | 4/1990 | Yoshiro | F16L 19/025 285/23 |
| 5,076,616 A * | 12/1991 | Williamson | F16L 19/0218 285/332.3 |
| 5,154,453 A * | 10/1992 | Nishio | F16L 19/041 285/341 |
| 5,794,986 A * | 8/1998 | Gansel | A61M 16/0816 285/148.16 |
| 6,447,026 B2 * | 9/2002 | Palvoelgyi | B60K 15/04 285/334.5 |
| 6,543,817 B1 * | 4/2003 | Turner | F16L 19/028 285/353 |
| 6,598,908 B1 * | 7/2003 | Wosik | F16L 19/055 285/332.3 |
| 8,746,752 B2 * | 6/2014 | Hayashi | F16L 41/021 285/247 |
| 2005/0017508 A1 * | 1/2005 | Mizukoshi | F16L 19/0283 285/334.5 |

FOREIGN PATENT DOCUMENTS

| | | | | |
|---|---|---|---|---|
| EP | 1022504 A1 * | 7/2000 | | B21D 39/20 |
| JP | 05014775 U | 2/1993 | | |
| JP | 2003232473 A * | 8/2003 | | F16L 19/0286 |
| KR | 1020100078135 A | 7/2010 | | |
| KR | 1020100113287 A | 10/2010 | | |
| KR | 101346722 B1 | 12/2013 | | |

\* cited by examiner (a)            (b)

(a)            (b)

(a)

(b)

(c)

(a)　　　　　　　　　(b)

(a)　　　　　　　　　(b)

(a)

(b)

(c)

FLEXIBLE JOINT

BACKGROUND OF THE INVENTION

Field of the Invention

The present invention relates generally to a flexible joint. More particularly, the present invention relates to a flexible joint that is configured to have a structure that can fundamentally prevent water leaking from contact surfaces between components, and allows easy manufacturing and cost saving since no additional welding process is required to maintain sealing effect.

Description of the Related Art

Generally, a flexible joint used for a sprinkler is a product designed to allow fast and easy construction of a sprinkler piping work in narrow and complex ceilings. The flexible joint is widely used because it facilitates precise dimension adjustment and finishing work by using annealed stainless steel, while not requiring thread cutting or dimensioning compared to existing steel pipe.

Conventionally, SUS, zinc pipe, CPVC pipe are used for a fire pipe, and a sprinkler flexible tube is used to connect various pipes with a sprinkler head, wherein the sprinkler flexible tube is made with a thin corrugated tube made of stainless steel having a thickness of 0.25 to 0.3 mm.

However, even though the conventional sprinkler flexible tube is made of stainless steel material, it is an imperfect construction considering corrosion caused by various causes, a tube welding rate of the corrugated tube, and a thickness reduction rate caused by forming. That is because the limit of durability is only up to 0.3 mm.

Further, since the fire pipe is usually constructed by filling it with water (wet), water leaks often occur over time after completion. In this case, economic damage is caused by water damage to household items such as appliances, thus causing discomfort to residents.

Leakage problems of the fire pipe can cause great discomfort and property damage to residents. Therefore, countermeasures are urgently required.

Meanwhile, the conventional fire pipe made of SUS or steel pipe is used by coupling the nut by being connected to the nut, and for the connection between CPVC pipe and a sprinkler flexible tube, an insert injection product has been used. As a result of research to reduce cost, the inventor has devised a product, in which the CPVC pipe and the sprinkler flexible tube are integrally formed.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Utility Model Registration No. 20-2009-0008212.

SUMMARY OF THE INVENTION

Accordingly, the present invention has been made keeping in mind the above problems occurring in the related art, and the present invention is intended to propose a flexible joint that is configured to have a structure that can fundamentally prevent water leaking from contact surfaces between components, and allows easy manufacturing and cost saving since no additional welding process is required to maintain sealing effect.

The present invention is further intended to propose a flexible joint configured such that CPVC pipe and a sprinkler flexible tube are integrally provided, thereby allowing cost saving.

In order to achieve the above object, according to one aspect of the present invention, there is provided a flexible joint including: a socket including a front end portion provided with a plurality of O-ring grooves, and a male threaded portion extending outward radially, circumferentially, and stepwisely from the front end portion with male threads formed thereon; a nut including an engaging portion engaged with an outer circumferential surface of the front end portion, and a female threaded portion extending stepwisely from the engaging portion and engaged with the male threaded portion; a sprinkler flexible tube communicating with an inner circumference of the socket, and having an enlarged portion inserted between the front end portion of the socket and the engaging portion of the nut, and a leak-proof portion bent outward from an end of the enlarged portion; and O-rings fitted over the O-ring grooves.

In order to achieve the above object, according to another aspect of the present invention, there is provided a flexible joint including: a socket including: a front end portion provided with an O-ring, and a male threaded portion extending outward radially, circumferentially, and stepwisely from the front end portion with male threads formed thereon; a nut including: an engaging portion engaged with an outer circumferential surface of the front end portion, and a female threaded portion extending stepwisely from the engaging portion and engaged with the male threaded portion; and a sprinkler flexible tube communicating with an inner circumference of the socket, and having an enlarged portion inserted between the front end portion of the socket and the engaging portion of the nut, and a double bent portion bent outward from an end of the enlarged portion to press the O-ring provided on the front end portion.

According to the present invention having the above-described characteristics, it is possible to significantly reduce cost since the metal sprinkler flexible tube is inserted between the CPVC socket and the CPVC nut to be integrally formed, whereby no additional insert injection product is required, and it is also possible to prevent leakage because when cool fire fighting water flows in the socket and the sprinkler flexible tube, the sprinkler flexible tube heat-shrinks, whereby the enlarged portion presses the O-ring to further come into close contact with each other.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, exemplary embodiments of the present invention will be described in detail with reference to the accompanying drawings. The present invention may, however, be embodied in many different forms and should not be construed as being limited to only the embodiments set forth herein.

<First Embodiment>

Figure 1:
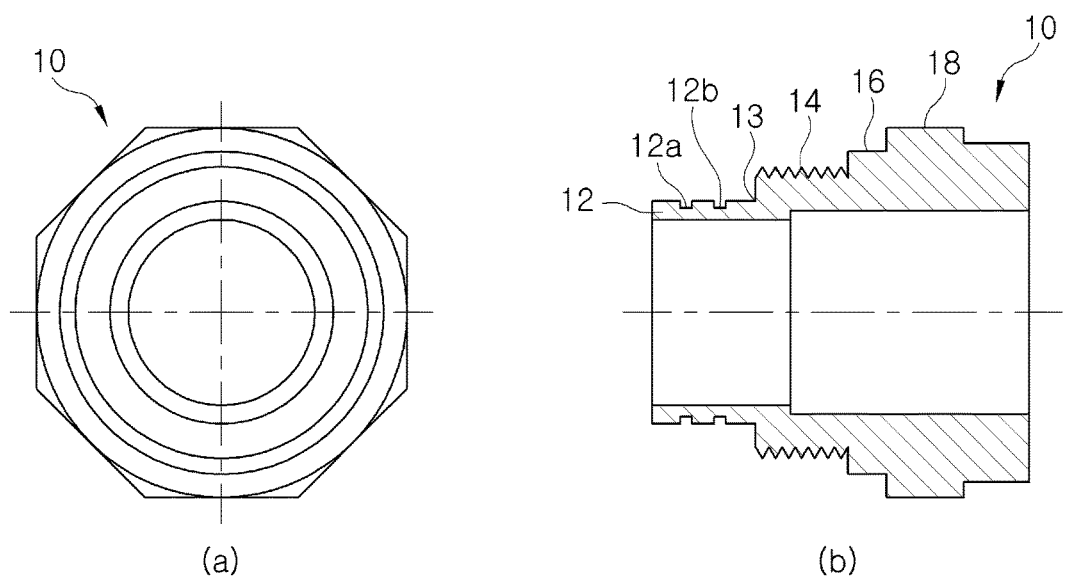
FIG. 1 illustrates a front view and a sectional view of a socket of a flexible joint according to a first embodiment of the present invention.
Figure 2:
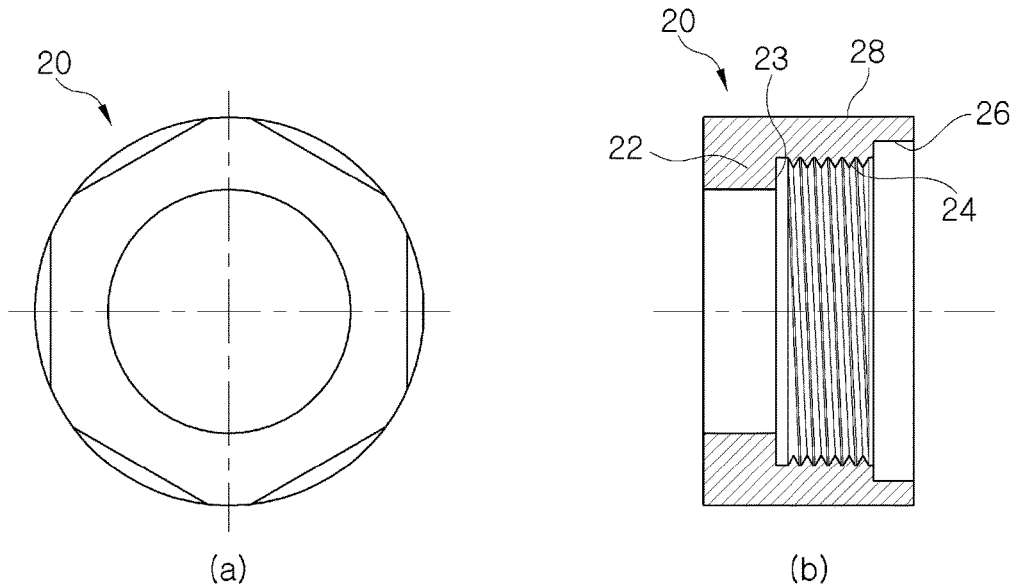
FIG. 2 illustrates a front view and a sectional view of a nut according to the first embodiment of the present invention.
Figure 3:
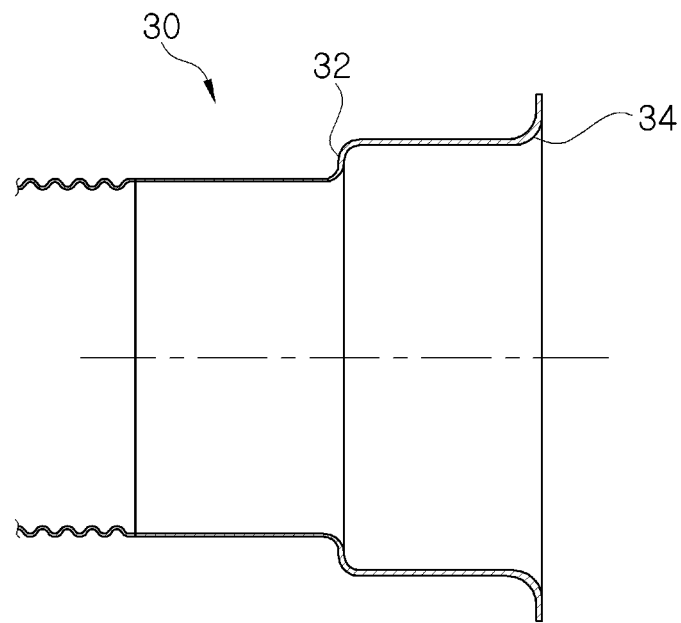
FIG. 3 illustrates a sectional view of an end portion of a sprinkler flexible tube according to the first embodiment of the present invention.
Figure 4:
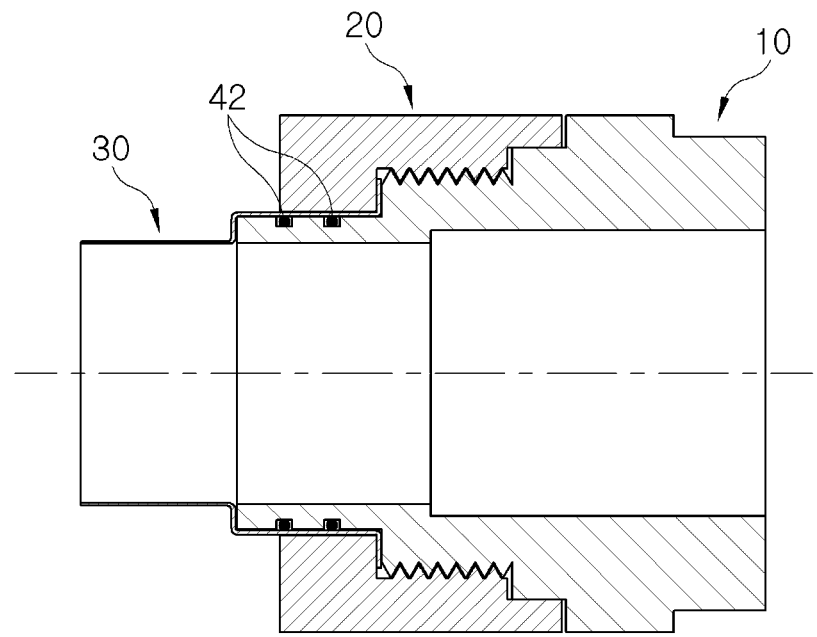
FIG. 4 illustrates a combined sectional view of the flexible joint according to the first embodiment of the present invention.
Figure 5:
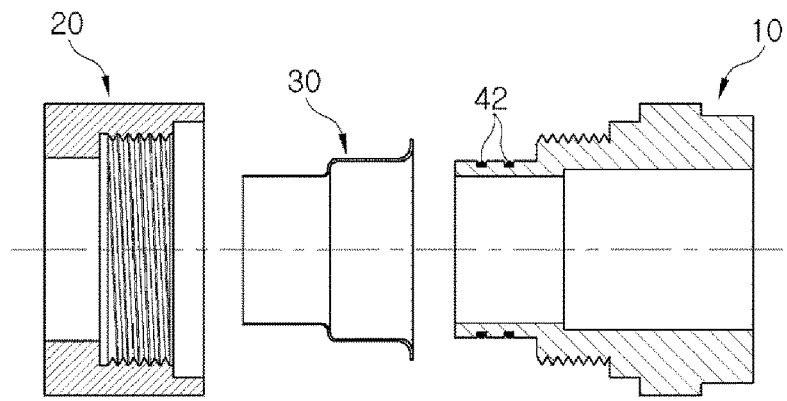
FIG. 5 illustrates sectional views of a stepwise combination of the flexible joint according to the first embodiment of the present invention.
Figure 5:
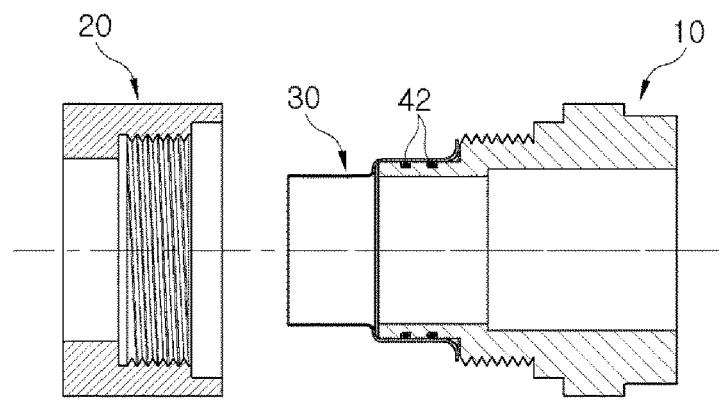
Figure 5:
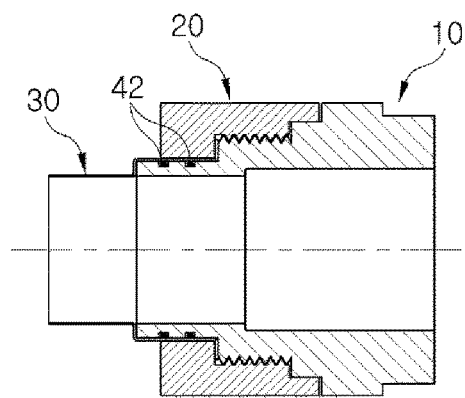

FIGS. 1 to 5 are views illustrating the first embodiment of the present invention, wherein FIG. 1 illustrates a front view and a sectional view of a socket of a flexible joint according to the first embodiment of the present invention; FIG. 2 illustrates a front view and a sectional view of a nut according to the first embodiment of the present invention; FIG. 3 illustrates a sectional view of an end portion of a sprinkler flexible tube according to the first embodiment of the present invention; FIG. 4 illustrates a combined sectional view of the flexible joint according to the first embodiment of the present invention; and FIG. 5 illustrates sectional views of a stepwise combination of the flexible joint according to the first embodiment of the present invention.

The flexible joint of the present invention includes: a socket 10 provided with a male threaded portion 14; a nut 20 formed with a female threaded portion 24 that is engaged with the male threaded portion 14; and a sprinkler flexible tube 30 inserted between the socket 10 and the nut 20.

The socket 10 may be used as a connection fitting that is connected to various pipes, such as water supply pipe, sewage pipe, and fire pipe, and as shown in FIG. 1, the socket is in a cylindrical tubular shape.

The present invention is configured such that the socket 10 and the nut 20 are provided with a plurality of steps to be engaged with each other in multiple stages, and an end portion of the sprinkler flexible tube 30 is inserted between the socket 10 and the nut 20 to be integrally formed, thereby forming a structure that is capable of maintaining sealing effect and preventing water leaking.

To be more specific, the socket 10 includes: a front end portion 12 provided with a plurality of O-ring grooves 12a and 12b, with which O-rings 40 is engaged; a male threaded portion 14 extending outward radially, circumferentially, and stepwisely from the front end portion 12 with male threads formed thereon; and a stepwise extended portion 16 formed at a rear end of the male threaded portion 14, thereby having three steps.

In other words, an outer circumferential surface of the front end portion 12 is a first step, the male threaded portion 14 is a second step, and the extended portion 16 is a third step.

The O-rings 40 are fitted over the O-ring grooves 12a and 12b.

Meanwhile, the nut 20 includes: an engaging portion 22 engaged with an outer circumferential surface of the front end portion 12; a female threaded portion 24 extending stepwisely from the engaging portion 22 and engaged with the male threaded portion 14; and a stepwise extended portion 26 formed at a rear end of the female threaded portion 24, thereby having three steps, like the socket 10.

In other words, the nut 20 is also configured such that an inner circumferential surface of the engaging portion 22 is a first step, the female threaded portion 24 is a second step, and the extended portion 26 is a third step.

As described above, the present invention configured such that the socket 10 and the nut 20 are provided with a plurality of steps to be engaged with each other in multiple stages is advantageous in that a contact area between the socket 10 and the nut 20 is enlarged, and sealing effect is maintained by enhancing a tightening force of the extended portion 26 of the nut 20 to the socket 10 when the socket 10 and the nut 20 are engaged with each other.

Meanwhile, the extended portions 16 and 26 may be applied with an adhesive to seal a junction between the socket 10 and the nut 20. The socket 10 and the nut 20 are made of the same material, that is, a CPVC material, which will be described below. Accordingly, when an adhesive is applied to the extended portions 16 and 26 and then the nut 20 and the socket 10 are engaged with each other, the adhesive slightly melts surfaces of the extended portions 16 and 26 of the nut 20 and the socket 10 to integrate the nut 20 and the socket 10 together, whereby it is possible to significantly improve a sealing force between the socket 10 and the nut 20.

As described above, since the nut 20 and the socket 10 of the present invention are configured to have multiple steps, it is possible to significantly improve a sealing effect between the socket 10 and the nut 20 by applying an adhesive to the extended portions 16 and 26, which are parts of the nut 20 and the socket 10.

Accordingly, it is possible to reduce manufacturing cost of a flexible joint by making the nut 20 and the socket 10 of the present invention with a CPVC material, and it is possible to significantly improve a sealing force between the socket 10 and the nut 20.

Meanwhile, the sprinkler flexible tube 30 is formed with a corrugated tube at a center thereof, and as shown in FIG. 3, an end portion is formed with a straight pipe, wherein the straight pipe has the same inner diameter as an inner diameter of the socket 10.

The sprinkler flexible tube 30 of the present invention includes: an enlarged portion 32 inserted between the front end portion of the socket 10 and the engaging portion 22 of the nut 20; and a leak-proof portion 34 bent outward from an end of the enlarged portion 32.

The enlarged portion 32 is enlarged to have the same inner diameter as an outer diameter of the front end portion 12, and is inserted into the front end portion 12; the leak-proof portion 34 is configured such that an end portion of the enlarged portion 32 is formed to have a shape extending in a direction orthogonal to an axial direction of the sprinkler flexible tube 30 when viewed from a cross-section.

When the nut 20 and the socket 10 are completely engaged with each other, the leak-proof portion 34 is inserted between vertical surfaces 13 and 23 extending outward radially, circumferentially, and stepwisely from the front end portion 12 of the socket 10 and the engaging portion 22 of the nut 20, respectively.

The leak-proof portion 34 serves to seal the nut 20 and the socket 10, thereby preventing fire fighting water flowing in the sprinkler flexible tube 30 from leaking.

The socket 10 and the nut 20 of the present invention are made of a CPVC material, and the sprinkler flexible tube 30 is made of a metal material, such as stainless steel, such that when cool water flows therein, the sprinkler flexible tube 30 heat-shrinks more than the socket 10 and the nut 20, whereby the enlarged portion 32 presses the O-rings 40 to come into close contact with each other, thereby preventing leakage.

In other words, the flexible joint of the present invention is configured such that when the nut 20 is engaged with the outer circumferential surface of the socket 10, the enlarged portion 32 of the sprinkler flexible tube 30 and the leak-proof portion 34 are inserted between contact surfaces of the nut 20 and the socket 10, whereby when cool fire fighting water flows in the socket 10 and the sprinkler flexible tube 30, the sprinkler flexible tube 30 heat-shrinks, and the enlarged portion 32 heat-shrinks, thereby exerting a force onto the outer circumferential surface of the front end portion 12 of the socket 10 to tighten the front end portion 12.

Generally, a thermal conductivity of SUS is 14 kcal/mh° C., and a thermal conductivity of brass is 95 kcal/mh° C., and on the contrary, a thermal conductivity of CPVC is 0.12 kcal/mh° C. Accordingly, the thermal conductivity of metal material and CPVC is considerably different, so the sprinkler flexible tube 30 made of SUS or brass heat-shrinks more than the socket 10 and the nut 20 made of CPVC material, whereby when cool fire fighting water flows in the socket 10 and the sprinkler flexible tube 30 in winter, the metal sprinkler flexible tube 30 significantly heat-shrinks, thereby tightening the CPVC socket 10 from the outside.

Accordingly, it is possible to prevent leakage from occurring between the socket 10 and the sprinkler flexible tube 30.

The present invention configured as described above fundamentally prevents problems occurring in the related art, and is advantageous in that it may be safely used without leakage of fire fighting water while not being influenced by seasons after the piping is installed, whereby it is possible to dramatically relieve inconvenience of residents.

Further, as shown in FIG. 1, the socket 10 is configured such that an outer circumferential surface 18 thereof has a cross section in a polygonal shape. The socket 10 is formed to be longer than a conventional one, so it is possible to dramatically improve worker convenience when engaging the nut 20 with the socket.

In other words, an additional flange is conventionally required to allow a worker to grip the socket when engaging the nut 20 with the socket, but the flange has to be made thin considering cost, and the like. Accordingly, it is difficult for a worker to work because the nut has to be rotated by gripping the thin flange, but the present invention is configured such that the socket 10 itself is formed to be in a polygonal shape, so the worker is allowed to grip the socket 10 when tightening the nut, whereby it is possible to dramatically improve workability.

<Second Embodiment>

Figure 6:
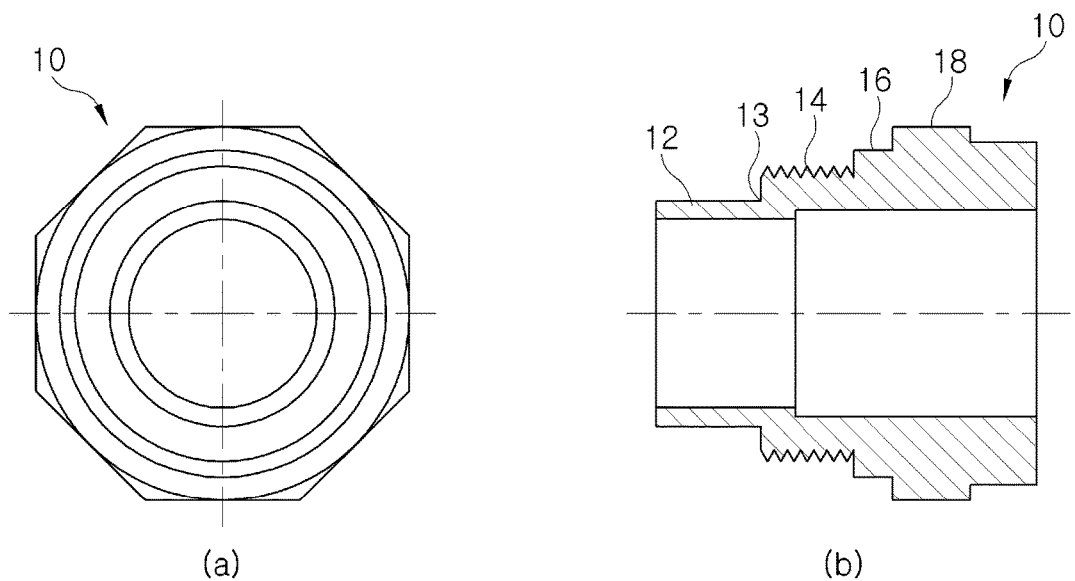
FIG. 6 illustrates a front view and a sectional view of a socket of a flexible joint according to a second embodiment of the present invention.
Figure 7:
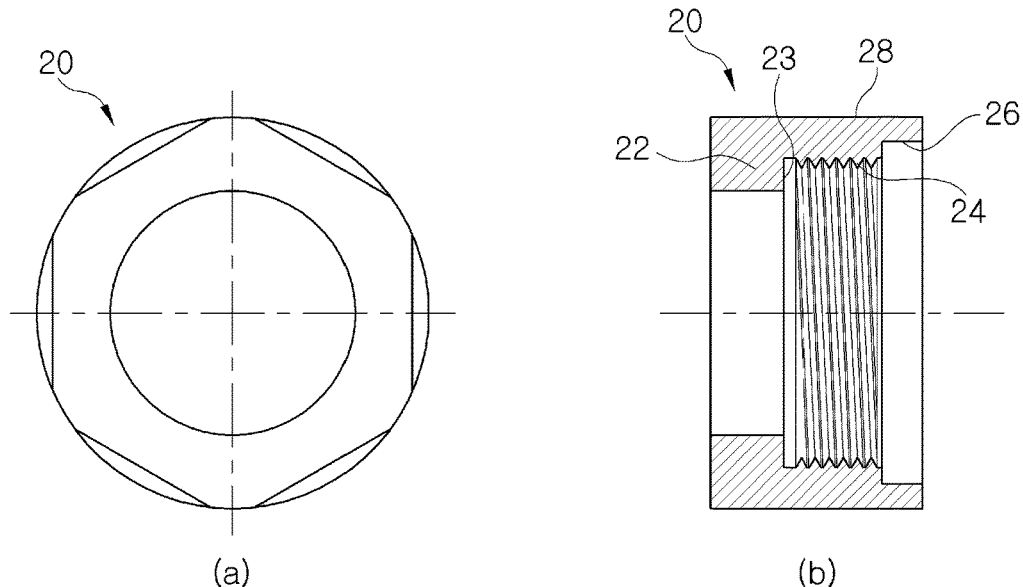
FIG. 7 illustrates a front view and a sectional view of a nut according to the second embodiment of the present invention.
Figure 8:
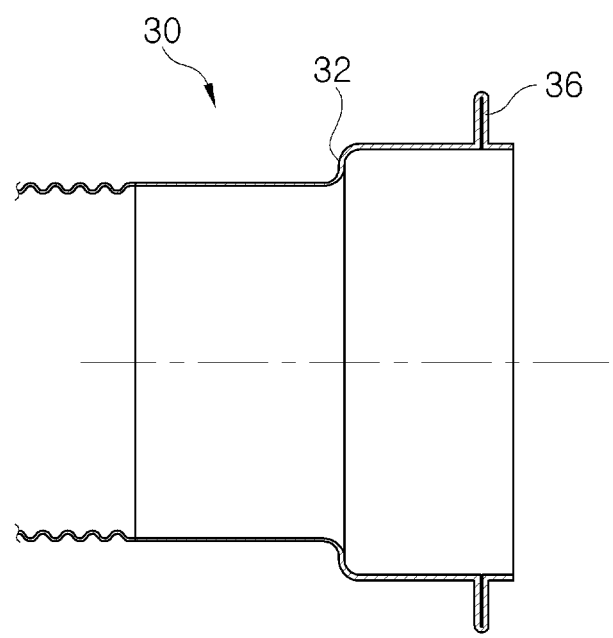
FIG. 8 illustrates a sectional view of an end portion of a sprinkler flexible tube according to the second embodiment of the present invention.
Figure 9:
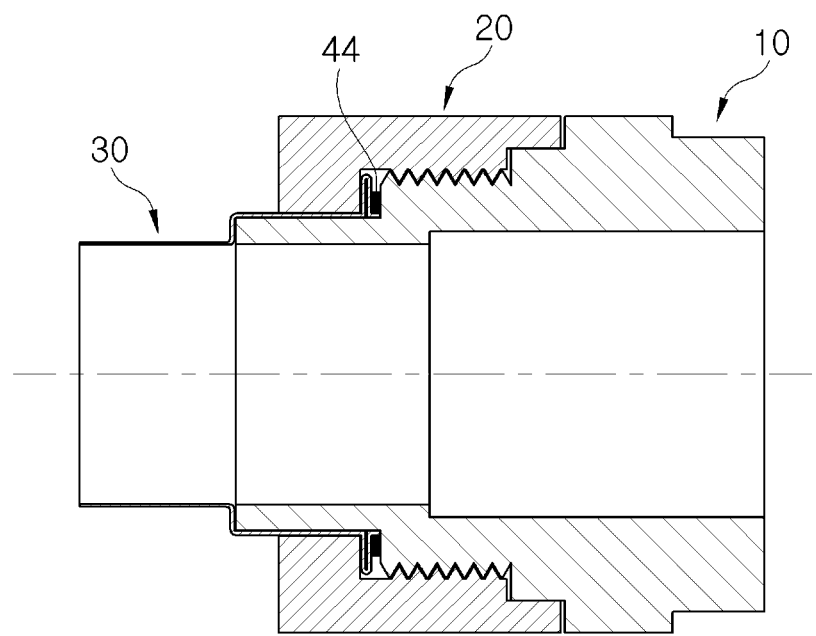
FIG. 9 illustrates a combined sectional view of the flexible joint according to the second embodiment of the present invention.
Figure 10:
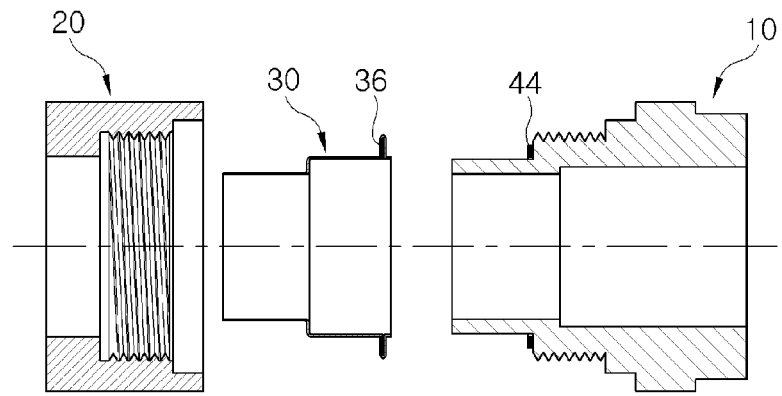
FIG. 10 illustrates sectional views of a stepwise combination of the flexible joint according to the second embodiment of the present invention.
Figure 10:
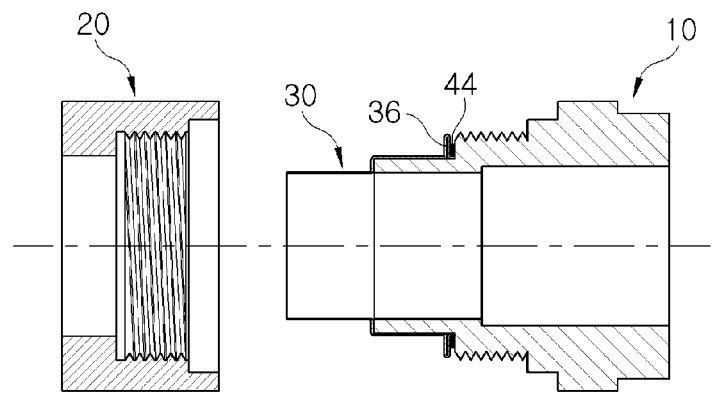
Figure 10:
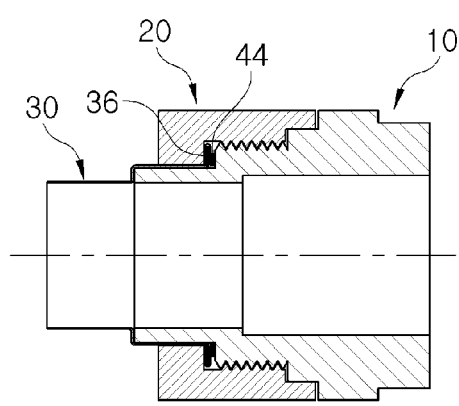
Figure 11:
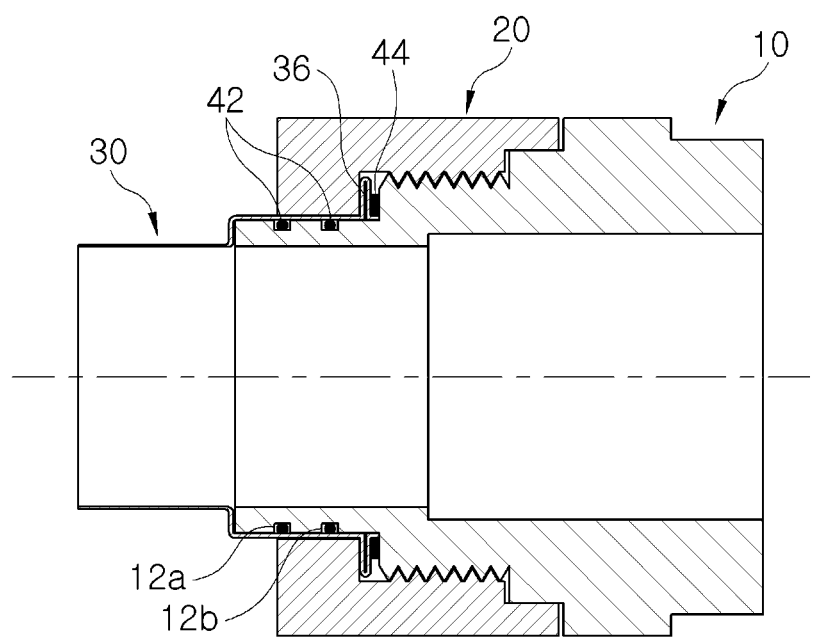
FIG. 11 illustrates a combined sectional view of the flexible joint according to a modification of the second embodiment of the present invention.

FIGS. 6 to 11 are views illustrating the second embodiment of the present invention, wherein FIG. 6 illustrates a front view and a sectional view of a socket of a flexible joint according to a second embodiment of the present invention; FIG. 7 illustrates a front view and a sectional view of a nut according to the second embodiment of the present invention; FIG. 8 illustrates a sectional view of an end portion of a sprinkler flexible tube according to the second embodiment of the present invention; FIG. 9 illustrates a combined sectional view of the flexible joint according to the second embodiment of the present invention; FIG. 10 illustrates sectional views of a stepwise combination of the flexible joint according to the second embodiment of the present invention; and FIG. 11 illustrates a combined sectional view of the flexible joint according to a modification of the second embodiment of the present invention.

The flexible joint of the present invention includes: a socket 10 provided with a male threaded portion 14; a nut 20 formed with a female threaded portion 24 that is engaged with the male threaded portion 14; and a sprinkler flexible tube 30 inserted between the socket 10 and the nut 20.

The socket 10 may be used as a connection fitting that is connected to various pipes, such as water supply pipe, sewage pipe, and fire pipe, and as shown in FIG. 11, the socket is in a cylindrical tubular shape.

The present invention is configured such that the socket 10 and the nut 20 are provided with a plurality of steps to be engaged with each other in multiple stages, and an end portion of the sprinkler flexible tube 30 is inserted between the socket 10 and the nut 20 to be integrally formed, thereby having a structure that is capable of maintaining sealing effect and preventing water leaking.

To be more specific, the socket 10 includes: a front end portion 12 provided with an O-ring 44; a male threaded portion 14 extending outward radially, circumferentially, and stepwisely from the front end portion 12 with male threads formed thereon; and a stepwise extended portion 16 formed at a rear end of the male threaded portion 14, thereby having three steps.

In other words, an outer circumferential surface of the front end portion 12 is a first step, the male threaded portion 14 is a second step, and the extended portion 16 is a third step.

As described above, the O-ring 44 is formed in the front end portion 12 of the socket 10. Alternatively, a plurality of O-ring grooves 12a and 12b may be formed in the front end portion 12 of the socket 10 for receiving O-rings 42, such that the respective O-rings 42 are fitted over the O-ring grooves 12a and 12b.

Meanwhile, the nut 20 includes: an engaging portion 22 engaged with an outer circumferential surface of the front end portion 12; a female threaded portion 24 extending stepwisely from the engaging portion 22 and engaged with the male threaded portion 14; and a stepwise extended portion 26 formed at a rear end of the female threaded portion 24, thereby having three steps, like the socket 10.

In other words, the nut 20 is also configured such that an inner circumferential surface of the engaging portion 22 is a first step, the female threaded portion 24 is a second step, and the extended portion 26 is a third step.

As described above, the present invention configured such that the socket 10 and the nut 20 are provided with a plurality of steps to be engaged with each other in multiple stages is advantageous in that a contact area between the socket 10 and the nut 20 is enlarged, and sealing effect is maintained by enhancing a tightening force of the extended portion 26 of the nut 20 to the socket 10 when the socket 10 and the nut 20 are engaged with each other.

Meanwhile, the extended portions 16 and 26 may be applied with an adhesive to seal the socket 10 and the nut 20.

The socket 10 and the nut 20 are made of the same material, that is, a CPVC material, which will be described below.

Accordingly, when an adhesive is applied to the extended portions 16 and 26 and then the nut 20 and the socket 10 are engaged with each other, the adhesive slightly melts surfaces of the extended portions 16 and 26 of the nut 20 and the socket 10 to integrate the nut 20 and the socket 10 together, whereby it is possible to significantly improve a sealing force between the socket 10 and the nut 20.

As described above, since the nut 20 and the socket 10 of the present invention are configured to have multiple steps, it is possible to significantly improve a sealing effect between the socket 10 and the nut 20 by applying an adhesive to the extended portions 16 and 26, which are parts of the nut 20 and the socket 10.

Accordingly, it is possible to reduce manufacturing cost of flexible joint by making the nut 20 and the socket 10 of the present invention with a CPVC material, and it is possible to significantly improve a sealing force between the socket 10 and the nut 20.

Meanwhile, the sprinkler flexible tube 30 is formed with a corrugated tube at a center thereof, and as shown in FIG. 8, an end portion is formed with a straight pipe, wherein the straight pipe has the same inner diameter as an inner diameter of the socket 10.

The sprinkler flexible tube 30 of the present invention includes: an enlarged portion 32 inserted between the front end portion of the socket 10 and the engaging portion 22 of the nut 20; and a double bent portion 36 bent outward from an end of the enlarged portion 32 to press the O-ring 44 provided on the front end portion 12.

The enlarged portion 32 is enlarged to have the same inner diameter as an outer diameter of the front end portion 12, and is inserted into the front end portion 12; the double bent portion 36 is configured such that an end portion of the enlarged portion 32 is formed to have a double bent shape extending and being bent in a direction orthogonal to an axial direction of the sprinkler flexible tube 30 when viewed from a cross-section.

When the nut 20 and the socket 10 are completely engaged with each other, the double bent portion 36 is inserted between vertical surfaces 13 and 23 extending outward radially, circumferentially, and stepwisely from the front end portion 12 of the socket 10 and the engaging portion 22 of the nut 20, respectively.

Here, the O-ring 44 formed on the front end portion 12 is also inserted between the vertical surfaces 13 and 23. In other words, the O-ring 44 is formed on the front end portion 12 of the socket 10 to come into contact with the vertical surface 13 of the socket 10, and the double bent portion 36 is formed to come into contact with the vertical surface 23 of the nut 20, whereby when the socket 10 and the nut 20 are engaged with each other, the O-ring 44 is pressed by the double bent portion 36.

The double bent portion 36 serves to seal a junction between the nut 20 and the socket 10, thereby preventing fire fighting water flowing in the sprinkler flexible tube 30 from leaking.

Meanwhile, the O-rings 42 may be formed in the O-ring grooves 12a and 12b.

The socket 10 and the nut 20 of the present invention are made of a CPVC material, and the sprinkler flexible tube 30 is made of a metal material, such as stainless steel, such that when cool water flows therein, the sprinkler flexible tube 30 heat-shrinks more than the socket 10 and the nut 20, whereby the enlarged portion 32 presses the O-ring 40 to come into close contact with each other, thereby preventing leakage.

In other words, the flexible joint of the present invention is configured such that when the nut 20 is engaged with the outer circumferential surface of the socket 10, the enlarged portion 32 of the sprinkler flexible tube 30, the double bent portion 36, and the O-ring 44 are inserted between contact surfaces of the nut 20 and the socket 10, whereby when cool fire fighting water flows in the socket 10 and the sprinkler flexible tube 30, the sprinkler flexible tube 30 heat-shrinks, and the enlarged portion 32 heat-shrinks, thereby exerting a force onto the outer circumferential surface of the front end portion 12 of the socket 10 to tighten the front end portion 12.

Generally, a thermal conductivity of SUS is 14 kcal/mh° C., and a thermal conductivity of brass is 95 kcal/mh° C., and on the contrary, a thermal conductivity of CPVC is 0.12 kcal/mh° C. Accordingly, the thermal conductivity of metal material and CPVC is considerably different, so the sprinkler flexible tube 30 made of SUS or brass heat-shrinks more than the socket 10 and the nut 20 made of CPVC material, whereby when cool fire fighting water flows in the socket 10 and the sprinkler flexible tube 30 in winter, the metal sprinkler flexible tube 30 significantly heat-shrinks, thereby tightening the CPVC socket 10 from the outside.

Accordingly, it is possible to prevent leakage from occurring between the socket 10 and the sprinkler flexible tube 30.

FIG. 11 is a view showing that the O-rings 42 and 44 are formed in each of the O-ring grooves 12a and 12b of the front end portion 12 of the socket 10, and the vertical surfaces 13 of the front end portion 12, wherein this configuration is capable of prevent leakage, by further sealing between the socket 10 and the sprinkler flexible tube 30.

The present invention configured as described above fundamentally prevents problems occurring in the related art, and is advantageous in that it may be safely used without leakage of fire fighting water while not being influenced by seasons after the piping is installed, whereby it is possible to dramatically relieve inconvenience of residents.

Further, as shown in FIG. 1, the socket 10 is configured such that an outer circumferential surface 18 thereof has a cross section in a polygonal shape. The socket 10 is formed to be longer than a conventional one, so it is possible to dramatically improve convenience of a worker when engaging the nut 20 with the socket.

In other words, an additional flange is conventionally required to allow a worker to grip the socket when engaging the nut 20 with the socket, but the flange has to be made thin considering cost, and the like. Accordingly, it is difficult for a worker to work because the nut has to be rotated by gripping the thin flange, but the present invention is configured such that the socket 10 itself is formed to be in a polygonal shape, so the worker is allowed to grip the socket 10 when tightening the nut, whereby it is possible to dramatically improve workability.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A flexible joint comprising:
a socket including: a front end portion provided with a plurality of O-ring grooves, and a male threaded por- tion extending outward radially, circumferentially, and stepwisely from the front end portion with male threads formed thereon;

a nut including: an engaging portion engaged with an outer circumferential surface of the front end portion, and a female threaded portion extending stepwisely from the engaging portion and engaged with the male threaded portion;

a sprinkler flexible tube communicating with an inner circumference of the socket, and having an enlarged portion and a straight pipe having a same inner diameter as an inner diameter of the socket provided at an end of the sprinkler flexible tube, and said enlarged portion is configured to be enlarged to have a same inner diameter as an outer diameter of the front end portion and is inserted between the front end portion of the socket and the engaging portion of the nut, and a leak-proof portion bent outward from an end of the enlarged portion; and O-rings fitted over the O-ring grooves.

2. The flexible joint of claim 1, wherein
the socket and the nut are made of a CPVC material, and the sprinkler flexible tube is made of a metal material, such that when cool water flows in, the sprinkler flexible tube heat-shrinks more than the socket and the nut, whereby the enlarged portion presses the O-rings to come into close contact with each other, thereby preventing leakage of the fire fighting water.

3. The flexible joint of claim 1, wherein
the socket is configured such that an outer circumferential surface thereof is in a polygonal shape, so as to allow a worker to tighten the nut while griping the socket when the nut is engaged with the socket.

4. A flexible joint comprising:
a socket including: a front end portion provided with a plurality of O-ring grooves, and a male threaded portion extending outward radially, circumferentially, and stepwisely from the front end portion with male threads formed thereon;

a nut including: an engaging portion engaged with an outer circumferential surface of the front end portion, and female threaded portion extending stepwisely from the engaging portion and engaged with the male threaded portion;

a sprinkler flexible tube communicating with an inner circumference of the socket, and having an enlarged portion inserted between the front end portion of the socket and the engaging portion of the nut, and a leak-proof portion bent outward from an end of the enlarged portion; and O-rings fitted over the O-ring grooves, wherein
the socket and the nut are provided with a plurality of the step to be engaged with each other in multiple stages, and a stepwise extended portion is provided at each of rear ends of the male threaded portion and the female threaded portion, so as to enlarge a contact area between the socket and the nut, and to enhance a tightening force of the nut to the socket.

5. The flexible joint of claim 4, wherein
the extended portion is applied with an adhesive to seal a junction between the nut and the socket.

6. The flexible joint of claim 4, wherein
when the socket is completely engaged with the nut, the leak-proof portion is inserted between vertical surfaces extending outward radially, circumferentially, and stepwisely from the front end portion of the socket and the engaging portion of the nut, respectively, thereby sealing a junction between the nut and the socket, and preventing leakage of fire fighting water flowing in the sprinkler flexible tube.

7. The flexible joint of claim 4, wherein
the socket and the nut are made of a CPVC material, and the sprinkler flexible tube is made of a metal material, such that when cool water flows in, the sprinkler flexible tube heat-shrinks more than the socket and the nut, whereby the enlarged portion presses the O-rings to come into close contact with each other, thereby preventing leakage of the fire fighting water.

8. The flexible joint of claim 4, wherein
the socket is configured such that an outer circumferential surface thereof is in a polygonal shape, so as to allow a worker to tighten the nut while griping the socket when the nut is engaged with the socket.

9. A flexible joint comprising:
a socket including: a front end portion provided with a plurality of O-ring grooves, and a male threaded portion extending outward radially, circumferentially, and stepwisely from the front end portion with male threads formed thereon;

a nut including: an engaging portion engaged with an outer circumferential surface of the front end portion, and a female threaded portion extending stepwisely from the engaging portion and engaged with the male threaded portion;

a sprinkler flexible tube communicating with an inner circumference of the sockets, and having an enlarged portion inserted between the front end portion of the socket and the engaging portion of the nut, and a leak-proof portion bent outward from an end of the enlarged portion; and O-rings fitted over the O-ring grooves, wherein
when the socket is completely engaged with the nut, the leak-proof portion is inserted between vertical surfaces extending outward radially, circumferentially, and stepwisely from the front end portion of the socket and the engaging portion of the nut, respectively, thereby sealing a junction between the nut and the socket, and preventing leakage of fire fighting water flowing in the sprinkler flexible tube.

10. A flexible joint comprising:
a socket including: a front end portion provided with an O-ring, and a male threaded portion extending outward radially, circumferentially, and stepwisely from the front end portion with male threads formed thereon;

a nut including: an engaging portion engaged with an outer circumferential surface of the front end portion, and a female threaded portion extending stepwisely from the engaging portion and engaged with the male threaded portion; and a sprinkler flexible tube communicating with an inner circumference of the socket, and having an enlarged portion inserted between the front end portion of the socket and the engaging portion of the nut, and a double bent portion bent outward from an end of the enlarged portion to press the O-ring provided on the front end portion.

11. The flexible joint of claim 10, wherein
the sprinkler flexible tube is provided at an end thereof with a straight pipe having a same inner diameter as an inner diameter of the socket, and the enlarged portion is configured to be enlarged to have a same inner diameter as an outer diameter of the front end portion, and is inserted into the front end portion.

12. The flexible joint of claim 10, wherein
the socket and the nut are provided with a plurality of steps to be engaged with each other in multiple stages.

13. The flexible joint of claim 10, wherein
a stepwise extended portion is provided at each of rear ends of the male threaded portion and the female threaded portion, so as to enlarge a contact area between the socket and the nut, and to enhance a tightening force of the nut to the socket.

14. The flexible joint of claim 13, wherein
the extended portion is applied with an adhesive to seal a junction between the nut and the socket.

15. The flexible joint of claim 10, wherein
when the socket is completely engaged with the nut, the O-ring provided on the front end portion of the socket is inserted between vertical surfaces extending outward radially, circumferentially, and stepwisely from the front end portion of the socket and the engaging portion of the nut, respectively.

16. The flexible joint of claim 15, wherein
when the socket is completely engaged with the nut, the double bent portion is inserted along with the O-ring between the vertical surfaces extending outward radially, circumferentially, and stepwisely from the front end portion of the socket and the engaging portion of the nut, respectively, thereby sealing a junction between the nut and the socket, and preventing leakage of fire fighting water flowing in the sprinkler flexible tube.

17. The flexible joint of claim 16, wherein
the socket is configured such that the front end portion thereof is provided with a plurality of O-ring grooves, and respective O-rings are fitted over the O-ring grooves.

18. The flexible joint of claim 17, wherein
the socket and the nut are made of a CPVC material, and the sprinkler flexible tube is made of a metal material, such that when cool water flows in, the sprinkler flexible tube heat-shrinks more than the socket and the nut, whereby the enlarged portion presses the O-rings to come into close contact with each other, thereby preventing leakage of the fire fighting water.

19. The flexible joint of claim 10, wherein
the socket is configured such that an outer circumferential surface thereof is in a polygonal shape, so as to allow a worker to tighten the nut while griping the socket when the nut is engaged with the socket.

* * * * *